June 24, 1930.  I. GONYK  1,767,975

LADLE FOR LOW MELTING MATERIALS

Filed Aug. 23, 1928

Inventor
Ignatz Gonyk
By Henry Ork
atty.

Patented June 24, 1930

1,767,975

UNITED STATES PATENT OFFICE

IGNATZ GONYK, OF VIENNA, AUSTRIA

LADLE FOR LOW-MELTING MATERIALS

Application filed August 23, 1928, Serial No. 301,594, and in Germany August 26, 1927.

My invention relates to improvements in ladles for low melting materials and comprises a ladle proper with a detachable handle. In the ladle proper a heating chamber is formed by means of partition walls. The heating device which is to be introduced into the heating chamber is arranged at the front end of the handle of the ladle so as to project from the handle when the same is in the detached position, whereas the feed device for the heating device is arranged within the handle.

The heating device may either consist in an electric heating coil or some other source of heat such as a burner for liquid fuel or a gas burner. It is an essential feature of my invention, that the handle is detachable so as to make the ladle applicable with any of the above named or other suitable sources of heat.

The accompanying drawing shows by way of example different embodiments of the ladle and the handle according to my invention, Figs. 1-5 illustrating the apparatus with an electric heating device.

Figure 4:
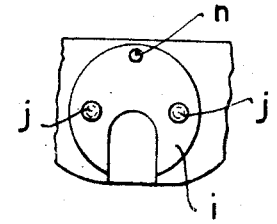
Figure 5:
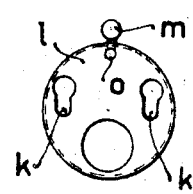
Figure 6:
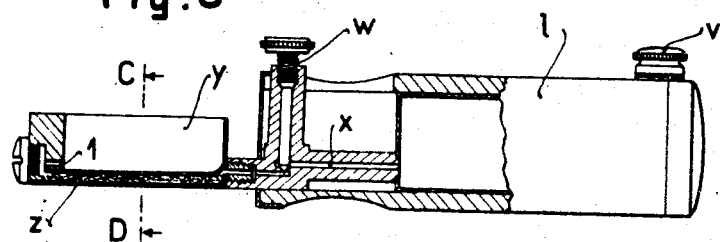

Fig. 4 a rear view of the ladle,

Fig. 5 a front view of the handle when detached;

Fig. 6 shows another embodiment of the handle, adapted for liquid fuel heating, in longitudinal section with the heating device projecting from the handle.

Figure 7:
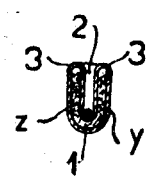
Figure 8:
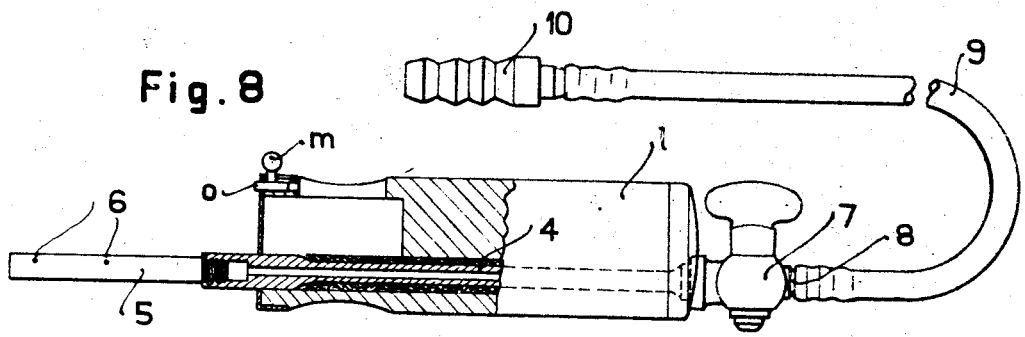

Fig. 7 is a section on line C—D of Fig. 6;

Fig. 8 is a longitudinal section through the handle with gas heating device.

The ladle proper comprises a main portion $a$ of parallelopipedic, elliptic or flat cylindric shape and a rounded off front portion $b$ of beak-like shape; this part is covered by a plate $d$ which, however, leaves open the kennel $c$. The main portion is provided with two longitudinal partitions $f$ closed at the front by a cross wall $e$ enclosing the heating chamber $h$; this chamber is open towards the bottom and partly closed towards the top by a cover having a slot $g$. The rear wall of the ladle carries a connecting plate $i$ of heat insulating material such as ebonite with asbestos washer or the like (Fig. 4) from which are projecting two screws $j$ with flat heads which are passed into circular enlarged portions of longitudinal slots $k$ at the front part of the handle $l$ and are pushed downward through said longitudinal slots the handle and the ladle being thus joined by shifting in a detachable manner. For securing this connection a sliding bolt $o$ (Fig. 5) is provided which is adapted to be projected from the front plane of handle $l$, by a knob $m$ and engage a hole $n$ of the connecting plate $i$. The top of the ladle may be covered by a plate $p$ which leaves open the slot $g$ of the heating chamber $h$ and which carries tongues $r$ extending below the cover $d$ of part $b$ of the ladle when the cover is applied to the ladle by means of a handle $q$.

Figure 1:
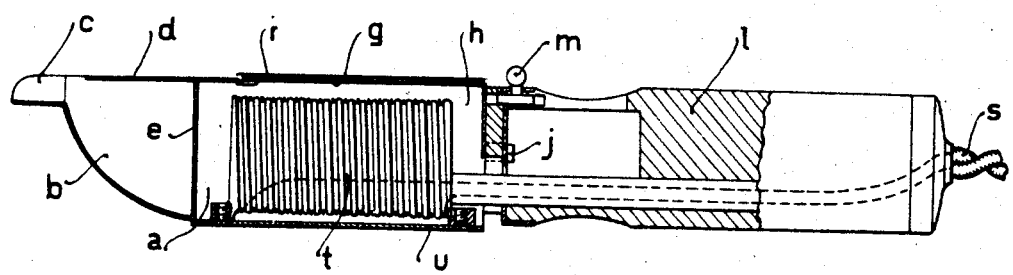
Fig. 1 is a longitudinal section through the ladle and the heating device.
Figure 2:
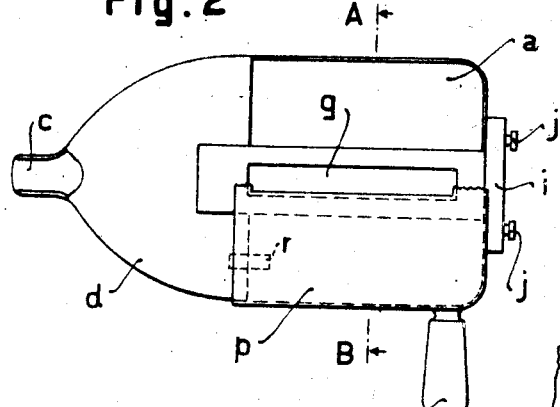
Fig. 2 shows the ladle proper in plan.
Figure 3:
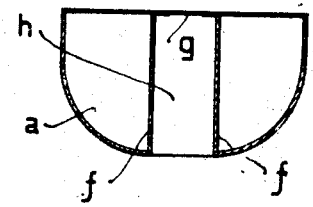
Fig. 3 is a section on line A—B of Fig. 2.

In the embodiment shown in Fig. 1 the handle $l$ has a longitudinal bore for receiving a cable $s$ of an electric heating coil $t$. The bottom of the heating chamber is closed by an asbestos lined plate $u$ passed in below the heating coil.

In the embodiment shown in Figs. 6 and 7 a heating device for liquid fuel, particularly methylated spirit, is used.

The handle $l$ of the ladle surrounds the receiver of the liquid fuel, said receiver being provided with an inlet fitting and screw $v$ and a needle valve $w$ by means of which the feed pipe $x$ may be controlled, which pipe leads to the carbureter $y$ of U-shaped cross-section. Into the carbureter $y$ is fitted a wick $z$ of asbestos or the like. The fuel may enter through a bore 1 into the channel 2 formed by the carbureter walls where it is ignited in order to effect the preheating of the carbureter walls whereafter the fuel gases pass through holes 3 and are used for heating the ladle.

For heating the ladle by means of gas the handle (Fig. 8) is provided with a longitudinal bore for receiving a gas pipe 4. Said pipe is connected to a burner tube 5 with holes 6 through which the gas escapes feeding the flame. The rear end of the gas pipe carries a cock 7 for controlling or shutting off the gas and a nipple 8 for connecting a flexible tube 9 of small cross-section to the gas pipe whereas the connection of said flexible tube to the ordinary main gas tube is made by means of a reducing nipple 10.

For operation the ladle the solid material to be melted is brought into the ladle, the heating device is started and the molten material poured through the kennel $c$ to the desired place of use.

With the device according to my invention it is possible to effect continuous melting of solid goods no matter which of the hereinbefore described heating device may be used.

If the embodiment of the handle for liquid fuel or gas is used the flames may be so regulated that they will not burn through slot $g$.

What I claim is:

1. A ladle for low melting materials comprising a ladle proper, a heating chamber in said ladle, and a detachable handle carrying a heating device for the ladle.

2. A ladle for low melting materials comprising a ladle proper, a heating chamber in said ladle, a detachable handle, and a heating device partly arranged in the handle and partly projecting therefrom into the heating chamber of the ladle.

3. A ladle for low melting materials comprising a ladle proper, a beak shaped front portion in said ladle, two longitudinal partitions and a cross wall in said ladle so arranged as to form a central heating chamber, a detachable handle, and a heating device arranged in the handle and partly projecting therefrom into the heating chamber of the ladle.

4. A ladle for low melting materials comprising a ladle proper, a central heating chamber in said ladle, a detachable handle, a heating device arranged in the handle and partly projecting therefrom into the heating chamber of the ladle, and a connecting device between the ladle and the handle consisting of a plate on the rear wall of the ladle, flat headed screws on said plate adapted to engage slots in the front wall of the handle.

5. A ladle for low melting materials comprising a ladle proper, a central heating chaber in said ladle, a detachable handle, a heating device arranged in the handle a connecting device between the ladle and handle, and a sliding bolt in the handle adapted to project into a hole in the plate of the ladle to lock the connection.

In testimony that I claim the foregoing as my invention, I have signed my name.

IGNATZ GONYK.